(12) United States Patent (10) Patent No.: US 9,218,058 B2
Bress et al. (45) Date of Patent: Dec. 22, 2015

(54) WEARABLE DIGITAL INPUT DEVICE FOR MULTIPOINT FREE SPACE DATA COLLECTION AND ANALYSIS

(76) Inventors: Daniel Bress, Germantown, MD (US); Mark Bernard Jacobs, Fairfax Station, VA (US); James Edward Dunstan, Springfield, VA (US); Steven Bress, Germantown, MD (US)

(*) Notice: Subject to any disclaimer, the term of this patent is extended or adjusted under 35 U.S.C. 154(b) by 471 days.

(21) Appl. No.: 13/471,454

(22) Filed: May 15, 2012

(65) Prior Publication Data

US 2012/0319940 A1 Dec. 20, 2012

Related U.S. Application Data

(60) Provisional application No. 61/497,720, filed on Jun. 16, 2011.

(51) Int. Cl.
*G06F 3/01* (2006.01)
(52) U.S. Cl.
CPC ................ *G06F 3/014* (2013.01); *G06F 3/017* (2013.01)

(58) Field of Classification Search
CPC ......... G06F 3/017; G06F 3/014; G06F 3/005; G06F 13/00; G06F 15/00; G06F 3/018
See application file for complete search history.

(56) References Cited

U.S. PATENT DOCUMENTS 8,581,856 B2 * 11/2013 Benko et al. .................. 345/173
2010/0302137 A1 * 12/2010 Benko et al. .................. 345/156

* cited by examiner

*Primary Examiner* — Michael Faragalla

(57) ABSTRACT

A new computer wearable input device, referred to as Imagine, may be used to control electronic devices in a natural, intuitive, convenient and comfortable manner, having a form factor which does not impede normal daily or business activities. For example, an Imagine may serve as an alternative to input devices such as a mouse, keyboard, or game controller. An Imagine device is able to recognize complex gestures, such as a person signing American Sign Language. An Imagine device may include a plurality of motion sensors affixed to a user's fingers and a plurality of motion sensors affixed to a user's wrists, a processing component and a communication component designed to communicate with a second electronic device.

25 Claims, 19 Drawing Sheets

| Left Pinky | Left Ring Finger | Left Middle Finger | Left Index Finger | Right Index Finger | Right Middle Finger | Right Ring Finger | Right Pinky | | |
|---|---|---|---|---|---|---|---|---|---|
| A | B | C | D | E | F | G | H |  | |
| I | J | K | L | M | N | O | P |  | |
| Q | R | S | T | U | V | W | X |  | |
| Y | Z | . | space | space | , | ' | " |  | |

WEARABLE DIGITAL INPUT DEVICE FOR MULTIPOINT FREE SPACE DATA COLLECTION AND ANALYSIS

FIELD OF INVENTION

The present invention relates generally to a wearable digital input device for interacting with computers and computing systems, such as computer game consoles. The invention relates in particular to a device for multipoint data collection in free space and the analysis of said data.

BACKGROUND

The present invention describes a wearable device for simultaneously gathering multiple data points in free space and the analysis of said data, for the purpose of controlling a computer and computer systems, such as a computer game console, as well as some techniques and devices which are usable in other types of equipment which requires digital input.

Technologies associated with digital input have evolved rapidly over the last several decades. In general the functions these technologies address can be classified as: Keyboard Input, Mouse Input, Gesture Input, Head Tracking Input and Motion Input.

Keyboard Input.

Of particular interest for this specification are devices designed to enter alpha-numeric data which are wearable. An example is USPTO Application 2004/0,210,166 which describes a binary (on/off) system for detecting finger motion. Another example is USPTO Application 2005/0,172,734 which describes a device for detecting finger motion, requiring a finger to be in proximity to a portion of the device.

Mouse Input.

Of particular interest for this specification are devices designed to control a single screen cursor, which are wearable or hand-held. An example is U.S. Pat. No. 7,626,572 which describes a hand-held device for detecting movement of the outer portions of the device through optical means. Another example is U.S. Pat. No. 7,239,301 which describes a hand held device for detecting movement in free space.

Gesture Input.

Of particular interest for this specification are devices designed to detect and analyze gestures. An example is USPTO Application 2005/0,172,734 mentioned above as it describes accelerometers to track motion in free space. Another example is USPTO Application 2005/0,212,767 which describes a single point gesture detection and analysis system.

Head Tracking Input.

Of particular interest for this specification is that devices known in the art, such as USPTO Application 2005/0,256,675 are directed towards determining the orientation of a head, typically in relation to a computer screen.

Motion Input.

Of particular interest for this specification are devices designed to detect motions which are wearable, such as U.S. Pat. No. 7,774,155, which describes a Nintendo game controller.

Wearable input device technology can be further examined based on the following characteristics: Form, Price, Human Input, Reliability, Data Collection, Usability, and Fashion.

Form.

For the purpose of this specification, Form refers to the geometry of a wearable input device. Referring to "Wireless Control Device" U.S. Pat. No. 6,747,632, an optical-based wearable input device, is described which includes a housing designed to be worn on the underside of a user's wrist. Thus its form is; a device worn on the underside of a wrist with a thickness sufficient for an optical sensor to detect finger motion past the heel of the palm. The form of "Data Input Device" USPTO 2005/0172734 is a "U" shaped device worn on a hand such that the palm side of the device is in proximity to a user's metacarpophalangeal joints and the device is of sufficient size to contain logic and circuitry. Even small differences in the form of a wearable input device can make a significant difference in the productivity and enjoyment of a user's experience, and thus is an important factor in a buy decision.

Reliability.

A metric for measuring reliability is mean time to failure (MTTF), as a typical user of wearable input devices will replace, rather than repair, a device upon failure. There is no correct MTTF for wearable input devices as design choices in form, function, price, accuracy, usability and fashion will impact MTTF. Consumers expect a wearable input device such as "Soap mobile electronic human interface device" U.S. Pat. No. 7,626,572 designed for an office environment, and used during business hours (e.g., eight hours a day, five days a week), to have a greater MTTF than a device such as "Hand-attachable controller with direction sensing" U.S. Pat. No. 5,796,354 designed for computer games, and used hours per week. When choosing between similar wearable input devices, consumers will base their buy decision on price and reliability.

Price.

Recent advances in technology, such as the reduced cost and size of computer chips, enable more flexibility in the design of consumer wearable input devices. Thus current devices may offer consumers more features at lower prices. It should also be noted that consumers have different requirements for computer input devices. For example some consumers only require a computer mouse with one button, while some consumers would prefer a mouse with multiple buttons and will pay a premium for devices with more functionality.

Human Input.

A metric for measuring a wearable input device is how much does the device constrain or dictate human motion. For example, a basic keyboard requires a binary switch to be depressed. In a similar fashion, U.S. Pat. No. 6,380,923 "Full-time wearable information managing device and method for the same" requires a fingertip to hit a surface. U.S. Pat. No. 6,747,632 requires a finger to bend toward the palm in a manner wherein a portion of the finger can be detected by an optical device worn on the wrist. USPTO Application 2010/0220054 "Wearable electrical apparatus" requires two human body surfaces to touch. USPTO Application 2010/0225590 "A Portable Wearable Input Apparatus" requires wearable switches to be activated.

Even small differences in the human input of a wearable input device can make a significant difference in the productivity and enjoyment of a user's experience, and thus are an important factor in a buy decision. Additionally, handicapped individuals may not have the means to use some wearable input devices.

Data Collection.

Data collection has three primary components: data points and degree-of-freedom (DOF) and type of data. The first metric to consider is how many different data points a device uses. For example, game consoles, free space mice and mobile phones with motion sensors only detect motion from one data point, the location of the device. USPTO Application 2005/0172734 detects the location of four fingers plus the location of the device itself in free space, so for the purposes of this specification it is considered to have 5 data points. The second metric to consider is the degree-of-freedom of an individual sensor. A free space input device will typically have either 2-dof or 6-dof sensors. USPTO Application 2010/0220054 is an example of a 2-dof device. For the purposes of this specification, binary switches such as a keyboard switch may be considered a 1-dof device, as only motion in one direction is required.

More Data Points.

Wearable input devices incorporate a wide variety, type and location of sensors. These devices are typically designed for one primary function such as keyboard or mouse input. Additional data points add to the complexity and cost of a device, so devices are designed to collect the minimum number of data points to accomplish their primary function. There are functions such as capturing and translating a gesture-based language, such as American Sign Language (ASL), which requires a device which captures more data points than is currently known in the art.

Fewer Data Points.

In some cases a device having more sensors is superior for its primary function to a device having fewer sensors. In other cases a device having fewer sensors is superior for its primary function to a device having more sensors. U.S. Pat. No. 6,636,826 "Orientation angle detector," describes a wearable device comprising a plurality of gyroscopes for tracking a user's head movements in virtual environments. Of particular note to this specification is that this head tracking is done for the purpose of transposing head movement into a virtual world. If the primary function of a wearable input device does not require head orientation, one far less expensive method to get data from head movement is to simply use one accelerometer to get simple 6-degree-of-freedom data.

Sensor Types.

Sensors vary widely in price, reliability and function. For example Fiber Optic gyroscopes have excellent accuracy but are more expensive than the less accurate Coriolis vibratory gyroscopes. A popular game controller uses a low G accelerometer which is adequate for most game functions. However when a player makes a vigorous golf swing the forces of the golf swing may be greater than a low G accelerometer can measure, and thus some data is lost. A more expensive high G accelerometer would solve this problem.

There are a number of different sensor types which are suitable for wearable computer input devices including: mechanical switches, magnetic switches, gyroscopes, etc. There is no correct sensor or combination of sensors for all wearable input devices.

Sensor Placement.

In some contexts wearable input devices which are analogues of conventional keyboards and mice are not wholly satisfactory. For example it is desirous that wearable input devices are unobtrusive and not inhibit normal user interaction. Furthermore when a user is performing a complex task requiring use of his or her hands it is desirable to provide user interfaces which are advantageous over the conventional alternatives. U.S. Pat. No. 7,454,309 "Foot activated user interface" describes a wearable foot controller input device, using a light sensor. Specific sensor location will directly influence both functionality and ease of use.

Usability.

There is no numerical metric to determine a wearable computer input device's usability, as usability depends on both the task to be performed, the constraints a device places on a user and a user's limitations and preferences. Additionally cost may play a factor in choosing one device over another.

One aspect of wearable computer input device usability is how well a device can perform a particular function. As discussed above, wearable computer input devices can perform multiple functions, such as keyboard input and mouse input. For example, U.S. Pat. No. 7,239,301 is primarily a free space mouse device, however, it can be configured to use as keyboard input. In a similar fashion, USPTO Application 2005/0172734 is primarily a keyboard input device, however, it can be configured to use as a free space mouse. In both cases, their primary function is far more usable than their secondary functions. Thus a user is more likely to pick the U.S. Pat. No. 7,239,301 device as the more usable device to control a video system than s/he is the 2005/0172734 device for the same task.

Another aspect of wearable computer input device usability is the degree a device hinders a user's movements and normal activity. For example the device described in 2005/0172734 has a form that constrains the mobility of a user's hand. A user could not use 2005/0172734 and hold a cup of coffee in the same hand. The device described in U.S. Pat. No. 6,747,632 has a form that projects from the bottom part of a user's wrist which would interfere with some normal activities such as changing a diaper.

Another aspect of wearable computer input device usability is how well a device performs in view of a user's limitations. Many wearable computer input devices require a user's input gesture to conform to a pre-set gesture. A differently abled user may have difficulties making particular gestures and a device that allows a user to define their own gestures would be preferable.

A further aspect of wearable computer input device usability is user preference. The devices described in 2005/0172734 and U.S. Pat. No. 6,747,632 are both designed for keyboard input. A user may find one of these devices more user-friendly and convenient than the other. A user may also find that neither of these devices meets his or her particular needs.

A substantial factor determining the productivity and utility users derive from their computers is the user-friendliness and convenience of the user's experience with a computer. Even a small difference in ease and convenience of the user interface can make a significant difference in the productivity and enjoyment of a user's experience, thus is an important factor in a buy decision.

Fashion.

For this specification fashion refers to whether a user will wear a particular wearable computer input device based on the device's look. Most users simply do not like to wear large clumsy devices as evidenced in the relative failure of VR headsets, particularly among women. Please refer to U.S. Pat. No. 6,970,157 FIGS. 10 and 11. The device pictured in these figures will not gain wide acceptance. There is no metric to describe why one wearable input device may be considered unfashionable. However, when in doubt, less is more. If a user is presented with two choices between similar wearable input devices s/he will pick the smaller one. To date computer wearable input devices have been designed primarily with functionality in mind.

The discussion above is merely provided for general background information and is not intended to be used as an aid in determining the scope of the claimed subject matter.

As can be seen from the above discussion there is no universal wearable computer input device that is right for all individuals or all functions.

SUMMARY

A new wearable computer input device, referred to as Imagine, has been invented. In one aspect, in general, an Imagine includes a plurality of sensors, and supporting logic and circuitry, designed to be worn by an individual and used for computer input. The sensors being arranged to provide data from multiple points on a human in such fashion that natural human gestures, such as American Sign Language can be captured and used as computer input. Further, an Imagine embodies a form that does not restrict natural human movement or activities. Additionally, an Imagine embodies a fashion designed for wide acceptance.

In one embodiment an Imagine device comprises a plurality of 3-axis (6-degree-of-freedom) sensors positioned on different fingers and/or thumbs and; two six-degree-of-freedom sensors positioned on the right and left wrist; a processing component connected to the sensors, configured to interpret data from the sensors; and an output component configured to provide a signal from the processing component to an electronic device.

In another embodiment an Imagine device comprises a plurality of 3-axis (6-degree-of-freedom) sensors positioned on different fingers and/or thumbs and; four (4) six-degree-of-freedom sensors positioned as followed, right hand, left hand, right wrist, and left wrist; a processing component connected to the sensors, configured to interpret data from the sensors; and an output component configured to provide a signal from the processing component to an electronic device.

In another embodiment an Imagine device comprises ten (10) 3-axis (6-degree-of-freedom) sensors, each of these sensors positioned on a different finger/thumb and; four (4) six-degree-of-freedom sensors positioned as followed, right hand, left hand, right wrist, and left wrist; a processing component connected to the sensors, configured to interpret data from the sensors; and an output component configured to provide a signal from the processing component to an electronic device.

In another embodiment there will be a method to teach an Imagine device user specific gestures. To facilitate this teaching, in particular for handicapped users, an additional embodiment will include additional means of user input to be used by a second user.

In another embodiment an Imagine device further comprises a button designed to be operated by the side of one thumb. This button may be used as an on/off button, additionally it may be used to signal the beginning/end state of a gesture.

In another embodiment an Imagine device processing component is further configured to recognize a lack of "start gesture" commands and put the Imagine into a "sleep state."

In another embodiment an Imagine device further comprises means to give a user feedback on the state of the device. Said feedback may include an indication that an event has occurred, such as: on, start gesture, end gesture, and gesture not recognized.

In another embodiment an Imagine device further comprises additional sensor or sensors at specific locations. Said locations may include: foot, ankle, elbow and head.

In another embodiment an Imagine device further comprises an additional button or buttons and additional sensor or sensors at non-specific locations, thus allowing user customization.

An Imagine device may be used while in a moving vehicle. In another embodiment an Imagine device further comprises a sensor or sensors positioned at locations designed such that the processing unit can subtract (dampen) the motion of a vehicle from a user's gestures.

In another embodiment an Imagine device further comprises means for attaching decorative features. One or more of these attach points may include a means to rotate the decorative feature as a means for further user input. Furthermore the decorative feature may include an RFID or similar device and means to recognize the RFID signal.

In another embodiment an Imagine device further comprises a means for voice input.

In another embodiment an Imagine device further comprises an e-field sensor.

In another embodiment an Imagine device further comprises additional logic and circuitry and a speaker to enable a user to input using a gesture language such as American Sign Language, and have these gestures produced as speech by the speaker.

In another embodiment an Imagine device's finger sensors are in rings. One or more of said rings may include means to display a decorative laser beam.

Other technical advantages will be readily apparent to one skilled in the art from the following figures, descriptions and claims. Moreover, while specific advantages have been enumerated above, various embodiments may include all, some or none of the enumerated advantages.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments of an Imagine device can be implemented in a variety of ways. The following descriptions are of illustrative embodiments, and constitute examples of features in those illustrative embodiments, though other embodiments are not limited to the particular illustrative features described.

An Imagine device provides advantages over existing wearable input devices, for example, in that it collects more data than existing devices. Furthermore an Imagine device allows a user to define gestures. Additionally, an Imagine device has a very small form factor, making it comfortable to wear and still be able to conduct normal day-to-day activities. Additionally, an Imagine device is fashionable, so users will feel not feel self-aware while using it. Therefore, a user wearing an Imagine device is able to input complex gestures, such as those used in American Sign Language, in a natural manner.

An Imagine device may be used in place of traditional interfaces such as a mouse, keyboard and game controller. An Imagine device may provide advantages when used as a mouse or keyboard by a differently-abled user, who has difficulties with traditional interfaces.

There are a number of advantages of using an Imagine device by a fully-abled user, in place of traditional input devices, such as mouse, keyboard, keyboard/mouse combination, game controller, or motion game controller. One knowledgeable in the art would recognize that the functionality of the Imagine may motivate software development designed to use the Imagine, for example, in the field of games. Additionally an Imagine device can be used to input to a dual-cursor gesture interface, such as the one seen in the movie "Minority Report".

An Imagine Device can emulate buttons on traditional input devices. One knowledgeable in the art would recognize that there are, in general, two uses of buttons. A button, such as a "shift" button on a keyboard is required to be depressed along with a second key. A button, such as a "caps lock" button changes the state of the keyboard, in that with caps lock off, characters are input as lower case but with caps lock on, characters are input as upper case. For purposes of discussion, the word button may refer to either type of button.

Figure 1:
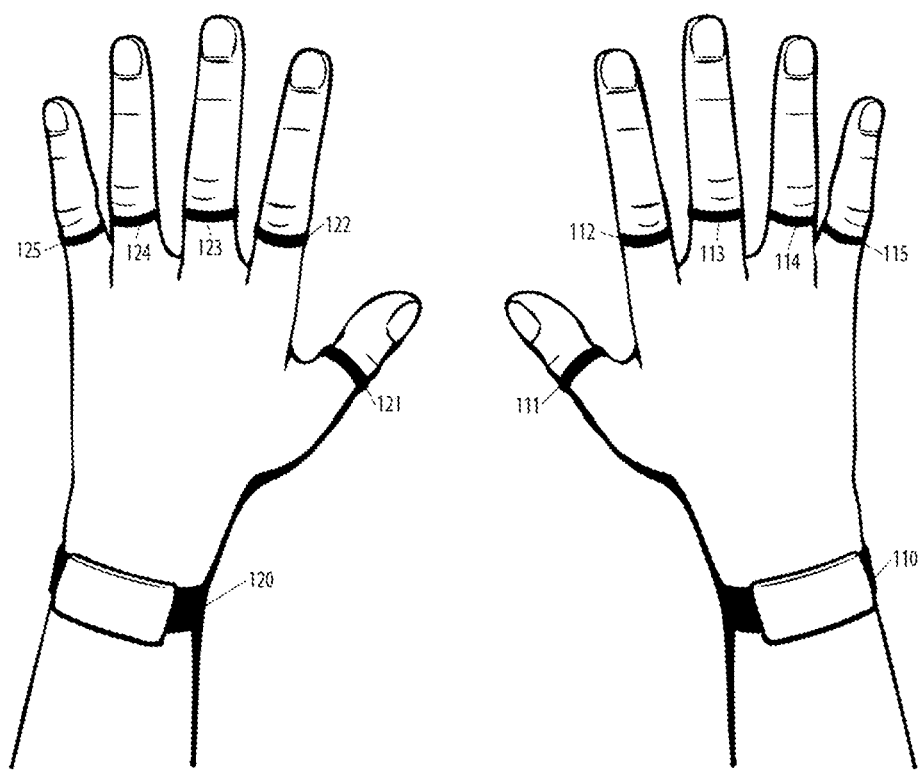
FIG. 1 depicts an Imagine device with finger sensors in rings, according to an illustrative embodiment.
Figure 2:
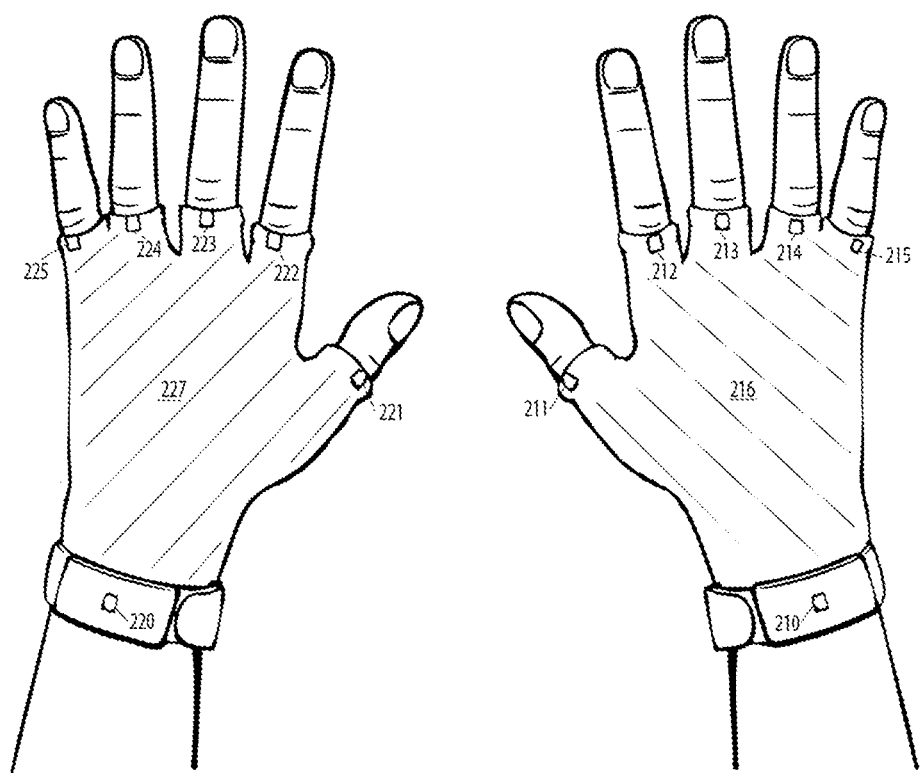
FIG. 2 depicts an Imagine device with finger sensors in a Lycra-like fabric, according to an illustrative embodiment.
Figure 3:
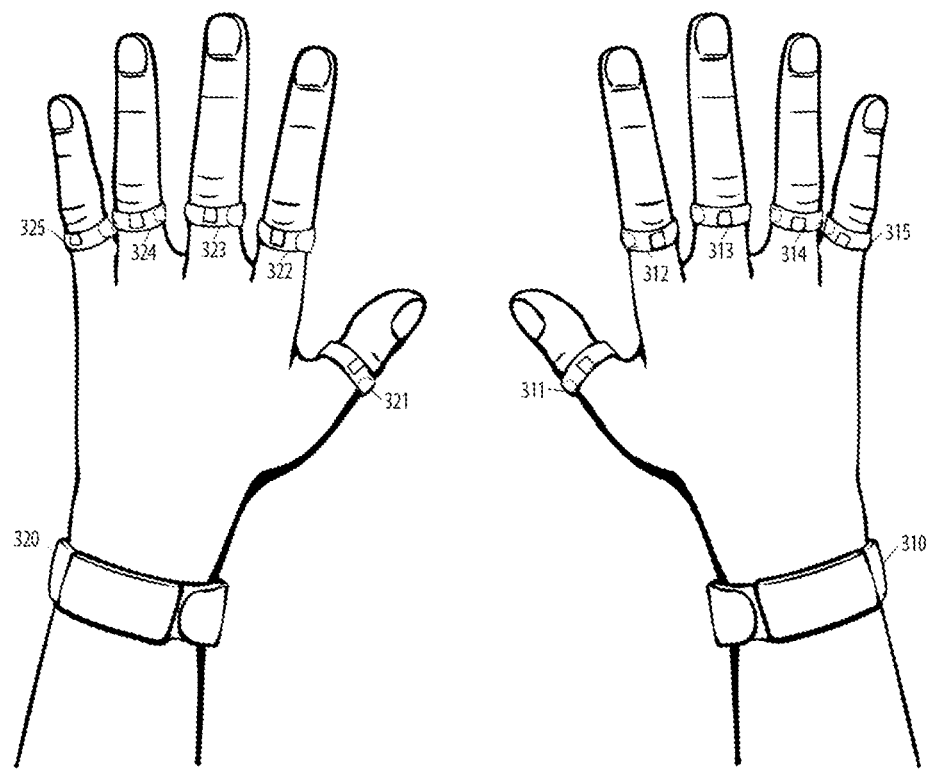
FIG. 3 depicts an Imagine device with Velcro rings, according to an illustrative embodiment.

FIGS. 1-3 exemplify three different illustrative embodiments of an Imagine Device. FIG. 1 depicts a user wearing an Imagine where the finger sensors are contained in solid rings. FIG. 2 depicts a user wearing an Imagine where the finger sensors are contained in a durable fabric, such as Lycra. One knowledgeable in the art will recognize that the Lycra can be configured to hold the sensors in pockets, enabling the sensors to be removed so the Lycra can be washed. FIG. 3 depicts a user wearing an Imagine, where the finger sensors are contained in Velcro strips. One knowledgeable in the art will recognize that an Imagine can be modified for individuals with less than ten functioning fingers.

Gestures

In the preferred embodiment of an Imagine device, when in gesture mode, a user indicates the start and end point of a gesture. One knowledgeable in the art would recognize that a gesture can be extracted from a data stream, but for the purpose of ease of discussion, and not limitation, gestures will be discussed as user initiated and terminated. A gesture comprises a motion or combination of motions of one or more sensors, simultaneously or sequentially. Additionally a gesture may have a time component. For example, a change in position of a finger sensor for one second may be considered different than a change in position of a finger sensor for two seconds. A gesture may be as simple as motion of a single finger or as complex as rubbing one's belly and head at the same time while hopping.

Gestures involve movement of a user's hands and/or other parts of the body. As such they are to some extent imprecise or "fuzzy." Additionally users may have various inadvertent movements, such as tremors that are unique to a user. One knowledgeable in the art would recognize that compensating for these inexact movements is known in the art, so for ease of discussion and not limitation, it will be considered that inadvertent movements will be removed.

A gesture is a movement, or series of movements of a user's hands and/or other parts of the body over time. For the purposes of this discussion t will equal time, as measured from the start of a gesture, x, y and z equal standard Cartesian coordinates. In one embodiment, an Imagine device has twelve (12) data collection sites, each site having x, y, z spatial data and t time data associated with it.

Modes

An Imagine device can be put in different modes, in which the same user input may produce perceived different results in one mode than it would in other modes. These modes include, but are not limited to, mouse input, keyboard input, gesture input, game controller input, motion game controller input and motion input.

In the preferred embodiment, an Imagine device in mouse mode may use the Cartesian coordinates x, y data from sensor 210 in FIG. 2 as input for the cursor position. In this case the z and t data from sensor 210 is not used.

In the preferred embodiment, an Imagine device in dual cursor mode may use the Cartesian coordinates x, y data from sensor 210 in FIG. 2 as input for one cursor position and may use the x, y data from sensor 220 for the second cursor position. In this case the z and t data from sensors 210 and 220 are not used.

Figure 6:
FIG. 6 is a grid chart of an alphabet, illustrating hand positions of an Image device for character input according to an illustrative embodiment.
Figure 6:
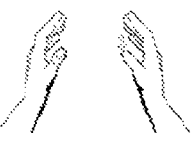
Figure 6:
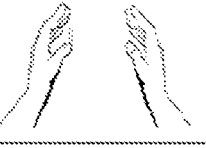
Figure 6:

Please refer to FIG. 6, which shows one embodiment of how a character may be chosen using an Imagine in keyboard mode. Depressing one finger selects a column on the chart. Thumb position selects a row on the chart. In this illustrative embodiment, to select the character "a" the left pinky is depressed and both thumbs remain in a neutral position. To select the character "x" the right pinky is depressed and the left thumb is depressed. One knowledgeable in the art would recognize that there are numerous additional ways to determine row focus such as but not limited to: height of wrist sensors 210 and 220 (raising and lowering the wrists), angle of wrist sensors 210 and 220 (twisting the wrists) and location of wrist sensors (lateral movement of the wrists).

Figures 7A, 7B:
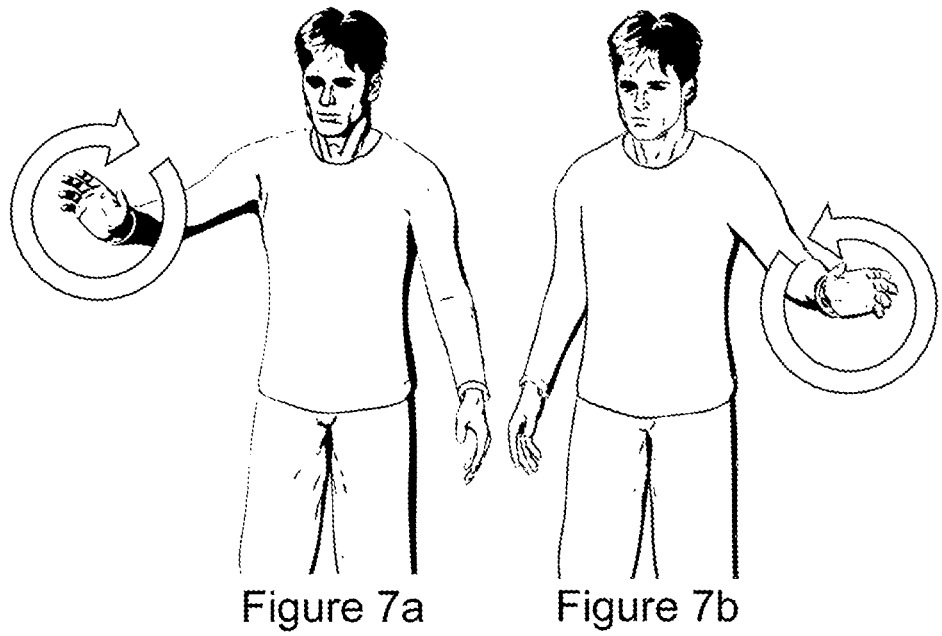
FIGS. 7a-c depicts a user making superficially similar gestures, according to an illustrative embodiment.
Figure 7C:
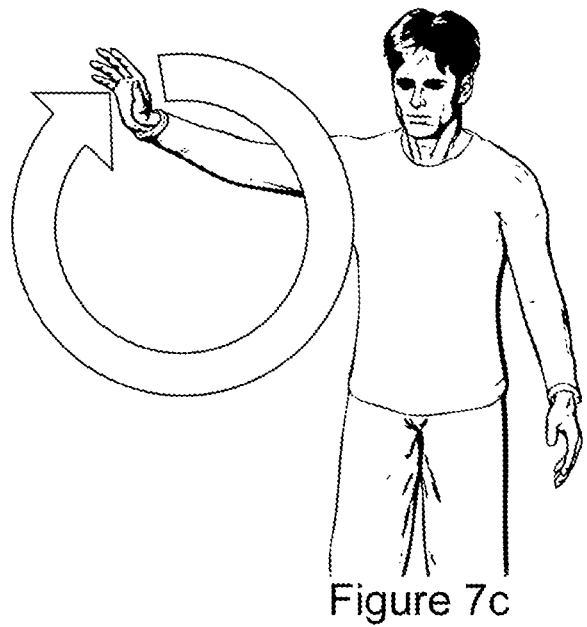

In the preferred embodiment, an Imagine device in gesture mode, alone or in combination with logic and circuitry of an external device, identifies user defined gestures and maps said gestures according to the need of an application and/or host. Of note, is that a user may define superficially similar gestures as being the same, or different. FIG. 7a illustrates a user making a small circle in one direction. FIG. 7b illustrates a user making a small circle in the opposite direction. FIG. 7c illustrations a user making a large circle. A user may make a circular gesture in various ways: such as small circles, large circles, circles with the right hand, with the left hand, clockwise circles, counter-clockwise circles, circles above the shoulders, completing circle gestures quickly, completing circle gestures slowly, etc. The user may define some or all of these gestures to be the same. For example, all circular gestures done quickly may map to one input, or all circular inputs done with the right hand may map to one input, etc.

In the preferred embodiment, in general, an Imagine device in motion mode sends un-mapped data to a host, such as a computer game. One knowledgeable in the art would recognize that for a particular host/application the data may need to be encoded or formatted. Using an Imagine device with its plurality of sensors, complex motion is able to be captured, such as that required to "hook" a bowling ball. One method for hooking a bowling ball is, at the moment of throwing the bowling ball, the hand should be behind the ball and where the thumb is anywhere between 10-o'clock and 12-o'clock, and the two fingers are between 4-o'clock and 6-o'clock. Just before releasing the ball, the entire hand starts rotating in a counter-clockwise motion. The thumb must fall out of the ball first. And the middle and ring finger release almost simultaneously, again in a counter-clockwise direction. The two fingers releasing while rotating is called "lift," where this type of a release gives the roll more torque and therefore more post. This release technique gives the bowling ball its spin needed for the hook. Thus, when playing a bowling game, an Imagine Device will gather and send enough un-mapped data for a host to accurately model a bowling ball throw.

In the preferred embodiment, an Imagine device in game controller mode sends data formatted to a particular host. In general, a traditional game controller comprises a plurality of buttons, switches and/or joysticks. The Imagine device sends a modified data stream that mimics the use of a traditional joystick. An Imagine device interprets a gesture made by a user and maps that to one of the input methods of a traditional game controller, and sends the appropriately formatted data to the host.

In the preferred embodiment, an Imagine device in motion game controller mode sends single point data from sensors 210 and/or 220 to correspond to the motion data expected by a motion game host. Furthermore an Imagine device interprets a gesture made by a user and maps that to one of the buttons of a traditional game controller, and sends the appropriately formatted data to the host.

Using an Imagine Device in Place of a Traditional Mouse

Figure 5A:
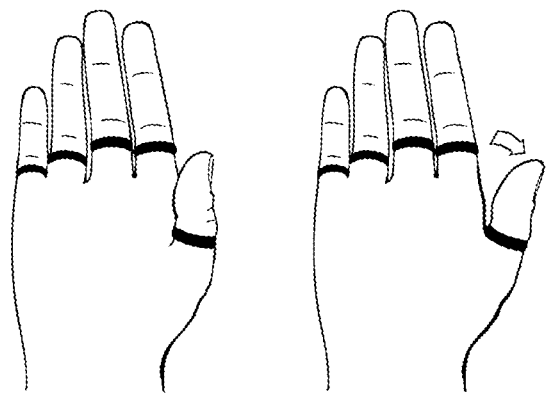
FIGS. 5a-c depicts an Imagine device in mouse mode, according to an illustrative embodiment.
Figure 5B:
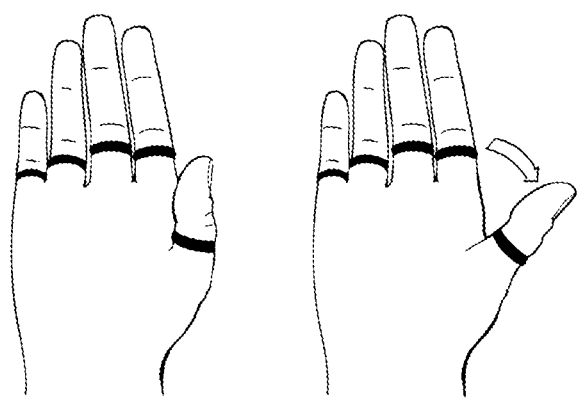
Figure 5C:
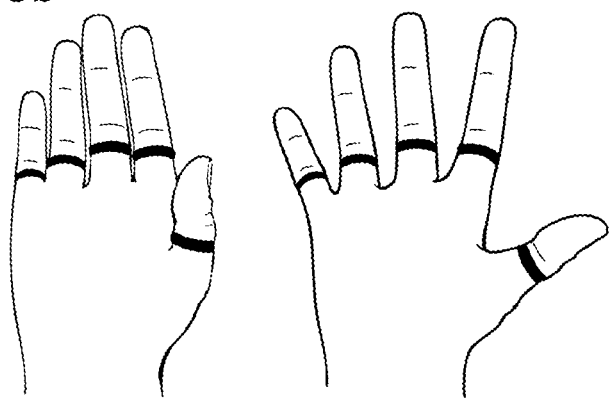

In the preferred embodiment, when the Imagine device is in mouse mode, one wrist sensor 210 or 220 is dedicated to mapping Imagine movement to traditional mouse movement. The other eleven sensors are available for gesture mapping. For example a small motion of a right thumb, see FIG. 5a, may be mapped to a traditional mouse button one. A large motion of a right thumb, see FIG. 5b, may be mapped to a traditional mouse button two. A "jazz-hand" motion of the right fingers may be mapped to a traditional mouse button three. For some applications a traditional mouse button is required to be continually depressed. One knowledgeable in the art would recognize that gesture mapping can be done as a single click or continuously on/off.

When using an Imagine device in mouse mode additional functionality is available to a user vs. traditional mice. For example: a grabbing gesture may be mapped to "open file," a vertical side-wards motion with the right palm may be mapped to "delete file," a horizontal sideward motion with the right palm may be mapped to "no," "jazz hands" may be mapped to Ventrillo Voice Software on/off, etc. Additionally gestures can be made and mapped from the non-mouse input hand. Thus an Imagine device in mouse mode can be used in place of a traditional keyboard/mouse combination. If typing is required while in mouse mode, an Imagine device can be put in keyboard mode with a single gesture, thus not affecting the flow of game play. One knowledgeable in the art would realize that a hybrid mode is possible with one hand in mouse mode and a second hand mapped to specific game functions, thus allowing an Imagine user to play mouse/keyboard games such as World of Warcraft.

There may be some users who appreciate the added flexibility of an Imagine device over a traditional mouse, but prefer the feel of a traditional mouse. In this case a user could de-activate their traditional mouse and rest their hand on it while using an Imagine device. Additionally objects that are designed to be moved on a desktop in a similar fashion to a traditional mouse, but digitally non-functional may be used with an Imagine device. These devices may be in a variety of sizes and decorative shapes.

Using an Imagine Device in Place of a Traditional Keyboard

Using an Imagine device in keyboard mode was discussed briefly above. Referring to FIG. 7, in the preferred embodiment, finger sensors determine column focus and thumb sensors determine row focus. In the embodiment illustrated in FIG. 2, that leaves two sensors 210 and 220 that can be used to for additional input.

Figure 8A:
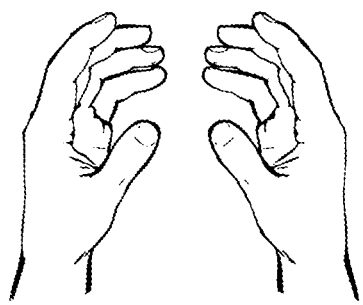
FIGS. 8a-d depicts additional input gestures for an Imagine device in keyboard mode, according to an illustrative embodiment.
Figure 8A:
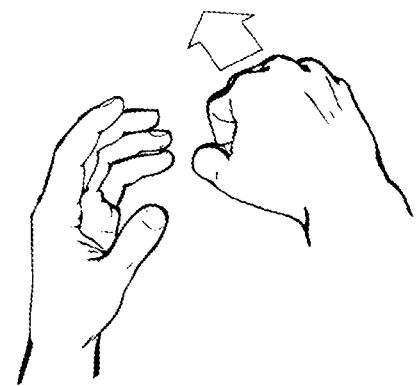
Figure 8B:
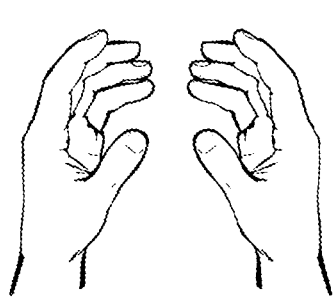
Figure 8B:
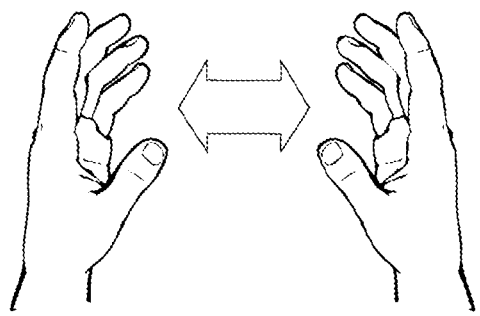
Figure 8C:
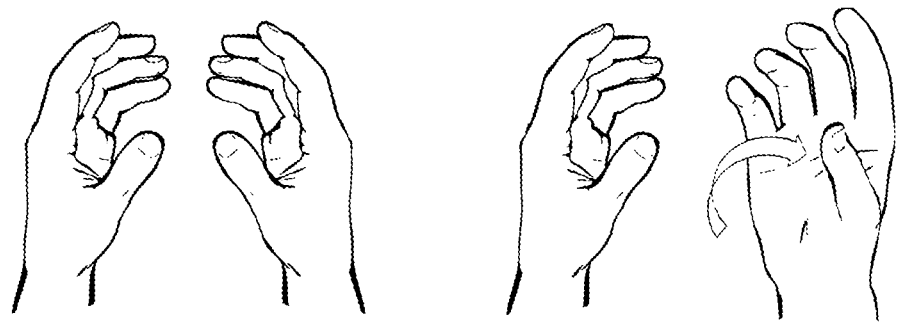
Figure 8D:
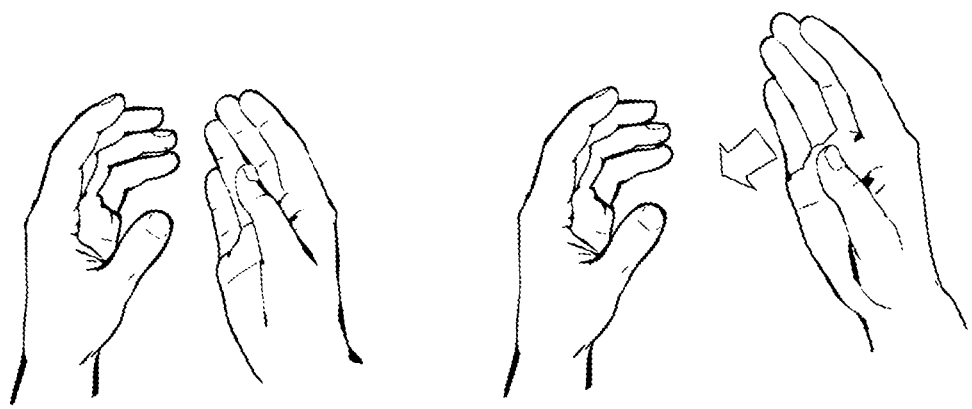

FIGS. 8a-d shows a few gestures, for illustration purposes and not limitation, using these two wrist sensors that enhance functionality of an Imagine device in keyboard mode. These gestures illustrate user input that can be mapped to keyboard shortcuts and/or functions when using an Imagine in place of a traditional keyboard. FIG. 8a illustrates a right hand palm up gesture, which may be mapped to "caps lock on". FIG. 8b illustrates a right hand slashing motion, which may be mapped to a "save file" function. FIG. 8c illustrates a right hand fist bump motion, which may be mapped to a "bold font" function. FIG. 8d illustrates hands moving apart, which may be mapped to an "enlarge font" function.

It is possible to quickly switch an Imagine device from keyboard to mouse mode on-the-fly. However, that requires four actions, switching to mouse mode, moving cursor to focus on an item, "clicking" focus item and, returning to keyboard mode. The gestures shown in FIG. 8a-d allow a user to quickly accomplish many activities, such as changing fonts, saving files, opening a thesaurus, etc. One knowledgeable in the art would understand that a different set of gestures can be substituted for these when inputting to other types of applications.

Using an Imagine Device in Place of a Traditional Game Controller

Figure 9A:
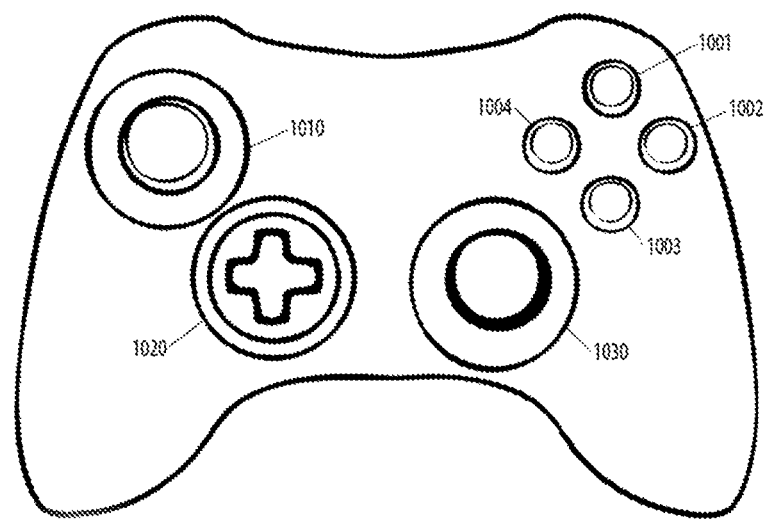
FIG. 9a depicts a traditional game controller, according to an illustrative embodiment.
Figure 9B:
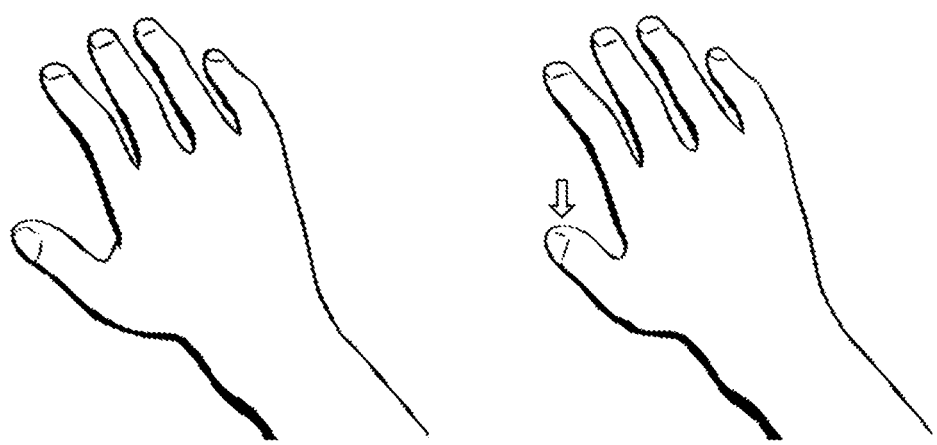
FIGS. 9b-d depicts Imagine gestures mapped to a traditional game controller, according to an illustrative embodiment.
Figure 9C:
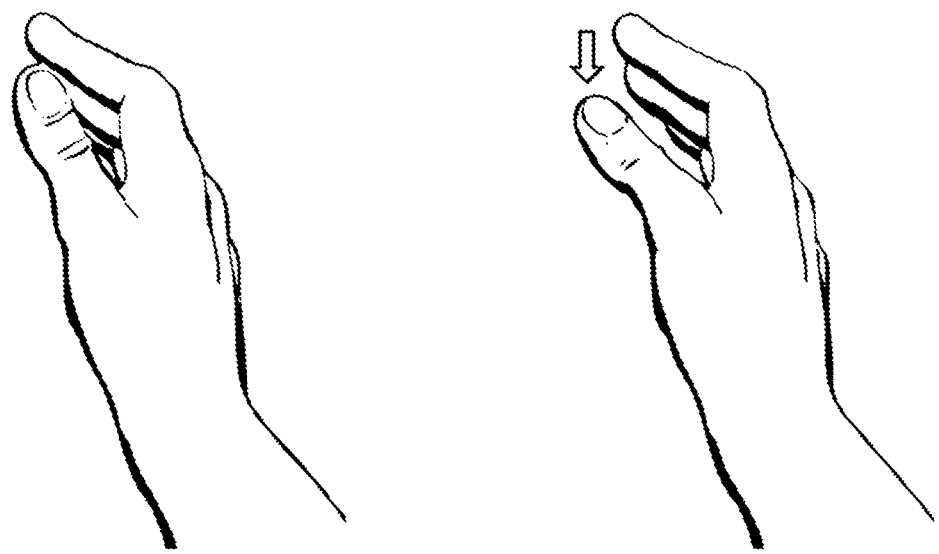
Figure 9D:
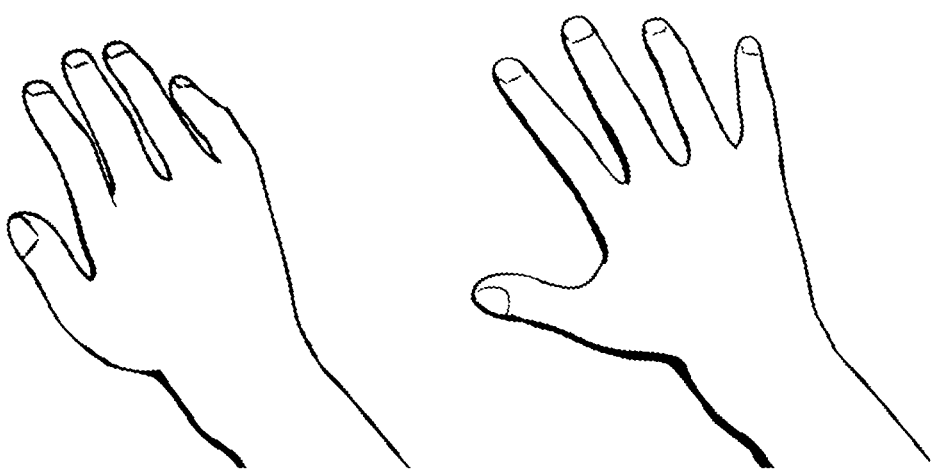

FIG. 9a depicts an illustration of a typical traditional game controller. FIGS. 9b-d illustrate three sets of gestures, presented for illustration and not limitation, which a user of an Imagine device may use to substitute for using the traditional game controller. FIG. 9b illustrates a downward motion of a right thumb with the palm facing downward, which may be mapped to button 1001. FIG. 10c illustrates a downward motion of a right thumb with the palm rotated, which may be mapped to button 1002. FIG. 10d illustrates a "jazz hands" movement of the right hand, palm downward, which may be mapped to button 1003.

Controller 1030 may be controlled by the motion of the right hand, with right and left rotation motion of the wrist used for one axis input (left and right), detected by sensor 210 and raising or lowering the palm used for another axis input (forward and back), detected by the position of sensor 210 relative to sensor 213. Controller 1020 may be controlled in a similar manner with the left hand. Switching between Controller 1020 and 1010 may be controlled by a "jazz hand" motion with the left hand.

An Imagine device has all the functionality of a typical traditional Game Controller. It has some advantages in that a user can map gestures to particular buttons, allowing for a quicker response time. Additionally, using an Imagine may help eliminate a common repetitive motion injury commonly called "gamer's thumb." An Imagine device allows a user to keep their hands further apart while playing which is both more comfortable and reduces muscle sprain.

Using an Imagine Device in Place of a Traditional Motion Game Controller

Figure 10A:
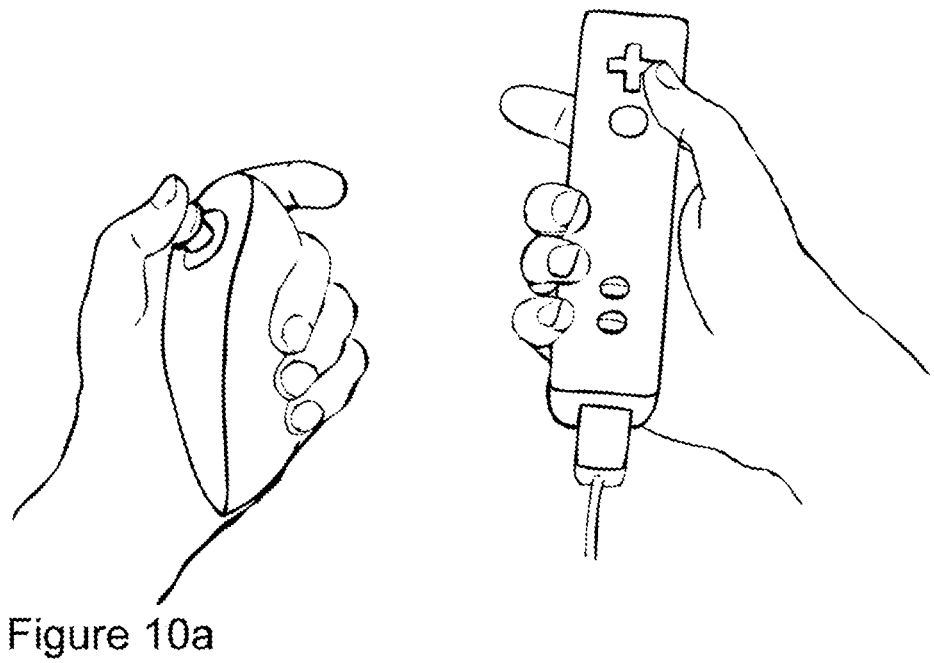
FIG. 10a depicts a traditional motion game controller, according to an illustrative embodiment.
Figure 10B:
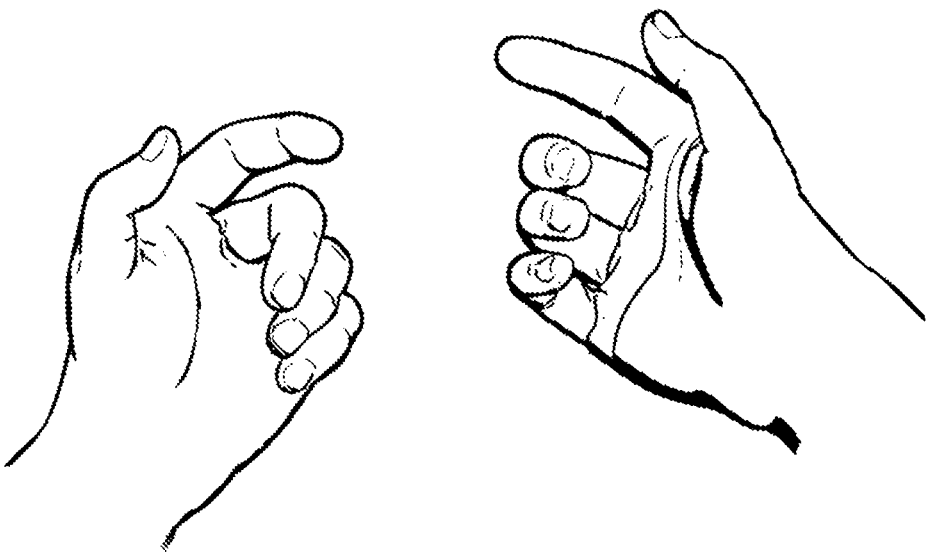
FIGS. 10b-e depicts Imagine gestures mapped to a traditional motion game controller, according to an illustrative embodiment.
Figure 10C:
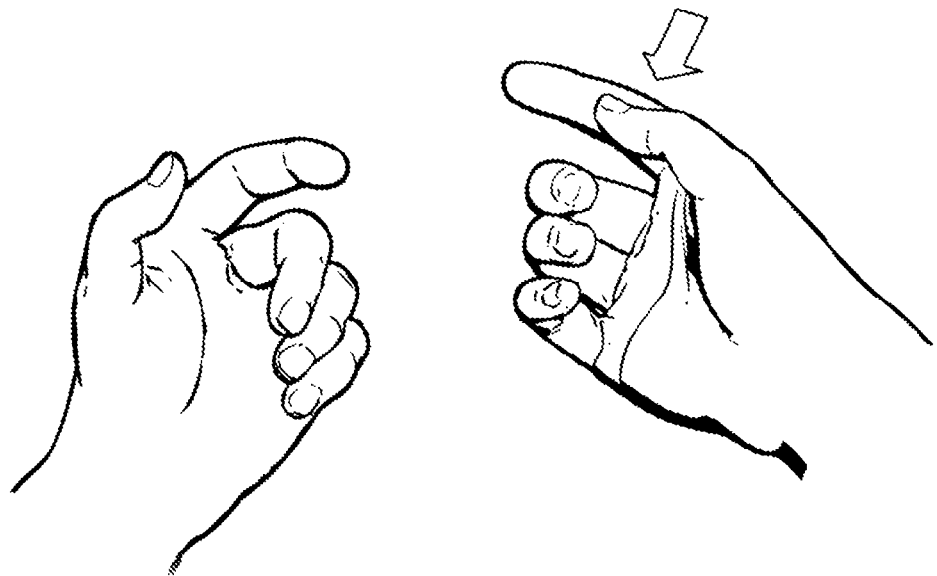
Figure 10D:
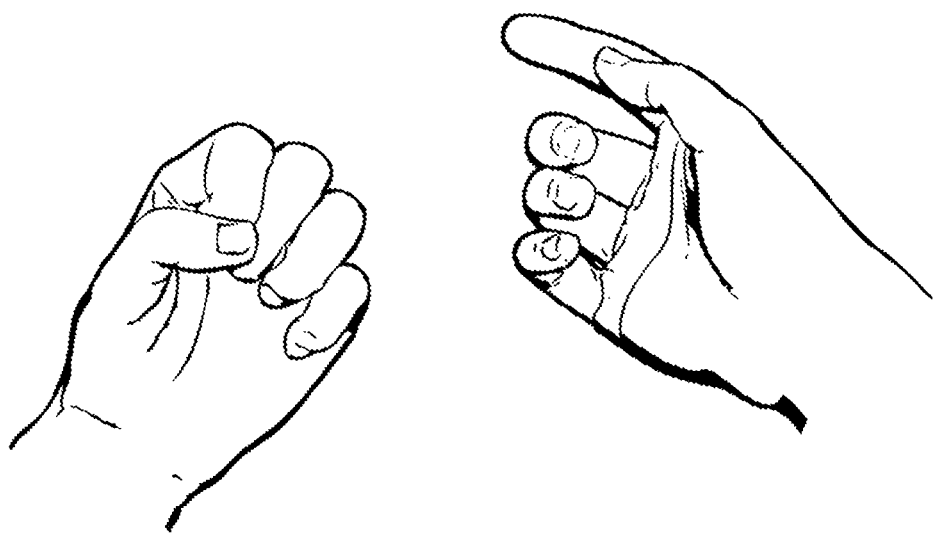
Figure 10E:
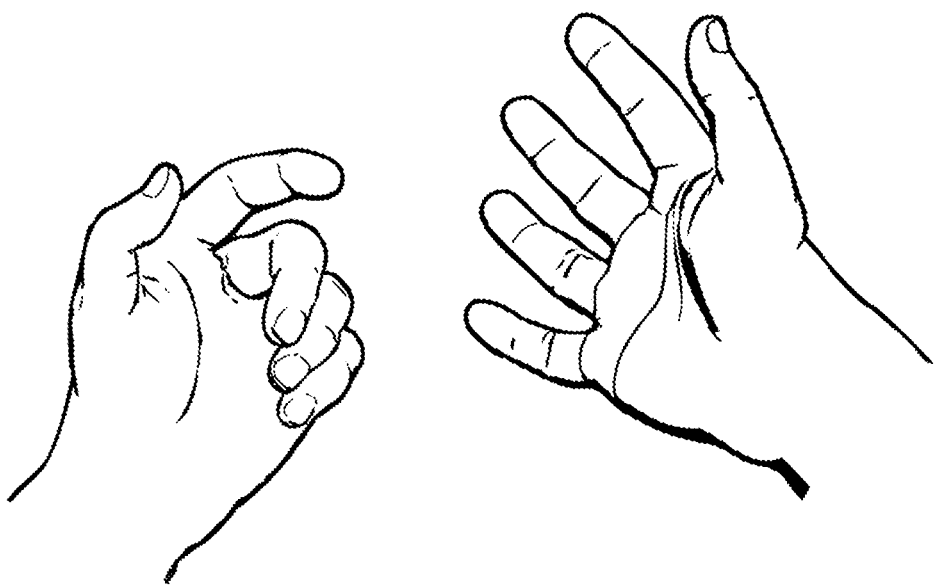

FIG. 10*a* depicts an illustration of a traditional motion game controller. FIGs b-e illustrate four sets of gestures, presented for illustration and not limitation, which a user of an Imagine device may use to substitute for using a traditional motion game controller. The use of single push buttons of a traditional motion game controller is similar to the traditional game controller discussed above. For example, in a driving game, acceleration may be mapped to jazz hands FIG. 10*e*, drifting may be mapped to depressing right thumb FIG. 10*b* and braking may be mapped to a fist FIG. 10*d*. These gestures may be determined from the finger sensors.

Additionally, traditional motion game controllers detect motion, from one or two locations. When using an Imagine device this motion may be detected from sensors 210 and/or 220. For example, a traditional motion game controller may be configured as a steering wheel, designed to be held in two hands and rotated by the user to steer a cart. Buttons may be used to activate additional features, such as acceleration and braking. An Imagine may use the wrist sensor/s to determine motion and the other sensors to detect activation of additional features.

Using an Imagine Device as a Dual Cursor Input

When using an Imagine Device as a Dual Cursor input, in the preferred embodiment, a sensor on the right hand controls one cursor and a sensor on the left hands controls a second cursor. In other aspects the Imagine Device in Dual Cursor input mode will act as described above in "Using an Imagine Device in place of a Traditional Mouse". One knowledgeable in the art would recognize that advances in the art of input devices, such as the Imagine, can drive software development, so although there are not dual cursor operating systems at the time of this writing, there will be in the future.

Using an Imagine Device as Input for a Gesture Based Language

Figure 11:
FIG. 11 depicts an Imagine device in use, worn by a user gesturing in American Sign Language, according to an illustrative embodiment.

An Imagine device, alone or in combination with logic and circuitry of an external device, has the ability to recognize a User communicating with a gesture based language, such as American Sign Language. An Imagine device does not interfere with daily activities and can be designed to be fashionable. Therefore some speech-impaired users will use an Imagine device to input words to a second portal device with a speaker, enabling these users to talk to individuals who do not recognize a user's gesture based language. One knowledgeable in the art would recognize the benefits of combining an Imagine device with the "Speech Communication System" described in U.S. Patent Application 20020069046, as well as other methods to use the words generated by the Imagine Device to drive a speaker. For example, once a gesture is identified it is mapped to an audio file containing a word or phrase, which then is played through a speaker. FIG. 11 illustrates a woman making the American Sign Language gesture for "coffee", while wearing an Imagine device.

Using an Imagine Device for a Gesture Based Game

In the field of computer gaming, innovations in input devices have led to an explosion of new games, as evidenced by new games for the Wii and Kinect controllers. One knowledgeable in the art would recognize that the Imagine device will drive software development. To illustrate, but not limit, a computer game using an Imagine device as input will be described. For ease of discussion this game will be called "Magus Tempestate". Magus Tempestate is a first-person shooter using magical spells as weapons. Magical spells have three components: step one, a series of gestures are used to pick a specific spell to cast; step two, a physical activity such as running-in-place is used to add power to a spell; step three, a "release spell" gesture modifies the spell chosen in step one. An experienced gamer will be able to perform steps one and two simultaneously.

One benefit of an Imagine device for gesture based games is the ability to add significant physical activity to a game. For example, a gamer may be required to rock sideways from leg to leg, to impart power to the spell, or to jump up and down. The longer a player performs a motion the more powerful the spell becomes, and the longer it takes to cast. Spell release gestures modify a spell, such as determining; the distance a damage spell will travel, the area affected by a damage spell and the speed a damage spell will travel at. A spell release gesture may include g-force data from sensors 210 and/or 220.

Onboard Gesture Recognition

In the preferred embodiment, gesture recognition can be determined with: a) the Imagine's onboard logic and circuitry; b) on a host attached to the Imagine; and/or c) a combination of the two. There are two primary considerations when designing the circuitry for an Imagine, price and size. One knowledgeable in the art would recognize that circuitry has historically gotten smaller and more powerful over time. Therefore, in the future an Imagine device's circuitry may become smaller and/or more powerful, or a combination of the two.

Sampling rate has a direct correlation to the amount of circuitry required for gesture recognition, with higher sampling rate requiring more powerful circuitry. Simple gesture recognition, such as required when an Imagine is in keyboard mode may be made with a low sampling rate, while more complex gestures, such as signing American Sign Language may require a higher sampling rate. The sampling rate required for gesture recognition may change depending upon a specific user. A user that is able to make precise gestures may use a low sampling rate for gesture recognition. A user with muscle tremors will require a high sampling rate.

As can be seen from the above discussion there is no one correct way to build an Imagine device and its actual circuitry configuration will depend upon the technology available at the time of circuit design and the market a particular embodiment is aimed at.

Defining Gestures

In the preferred embodiment, a user is able to define and map a gesture, in contrast to other devices where a user must learn pre-defined gestures. FIG. 8*a* is one example of a default start/stop-gesture, according to an illustrative embodiment. In the preferred embodiment, in general, defining gestures is a three-step process: repeating a user defined gesture, accepting the gesture and, mapping the gesture. To illustrate, but not limit user defined gestures, the following example will discuss a user defining a circular gesture.

In the first step a user initiates a start-gesture command, such as the gesture illustrated in FIG. 8*a*. The user then makes a user defined gesture, such as a circular gesture, see FIG. 7*a*.

The user signals the end of the user defined gesture by making an end-gesture gesture, see FIG. 8a. This sequence is repeated an undefined number of times.

Gestures may have additional components, such as a timed component. In the above example, a medium circle completed in 0.5 seconds may be a different gesture than a medium circle completed in 2 seconds. Similarly a medium circle completed while a user is standing still may be different gesture than a medium circle completed while a user is hopping on one leg.

Once a user accepts a gesture, the gesture is then mapped. Mapping is well known in the art. Of note is that a gesture can be mapped differently depending upon the mode an Imagine is in.

As discussed above, there are cost and size limitations to how much circuitry an Imagine device can have on board, which impacts on-board gesture recognition. Of note is that a user may choose which gestures an Imagine device detects on board. Thus in some cases an Imagine device may act as a plug-and-play device, with no driver or other software required on the host. For example, it may be possible to store all gestures for an Imagine device in keyboard/mouse mode onboard.

One knowledgeable in the art would recognize that the above is just one method for defining gestures and that there are other methods known in the art that could be used with the Imagine device.

Hardware Description

Figure 4:
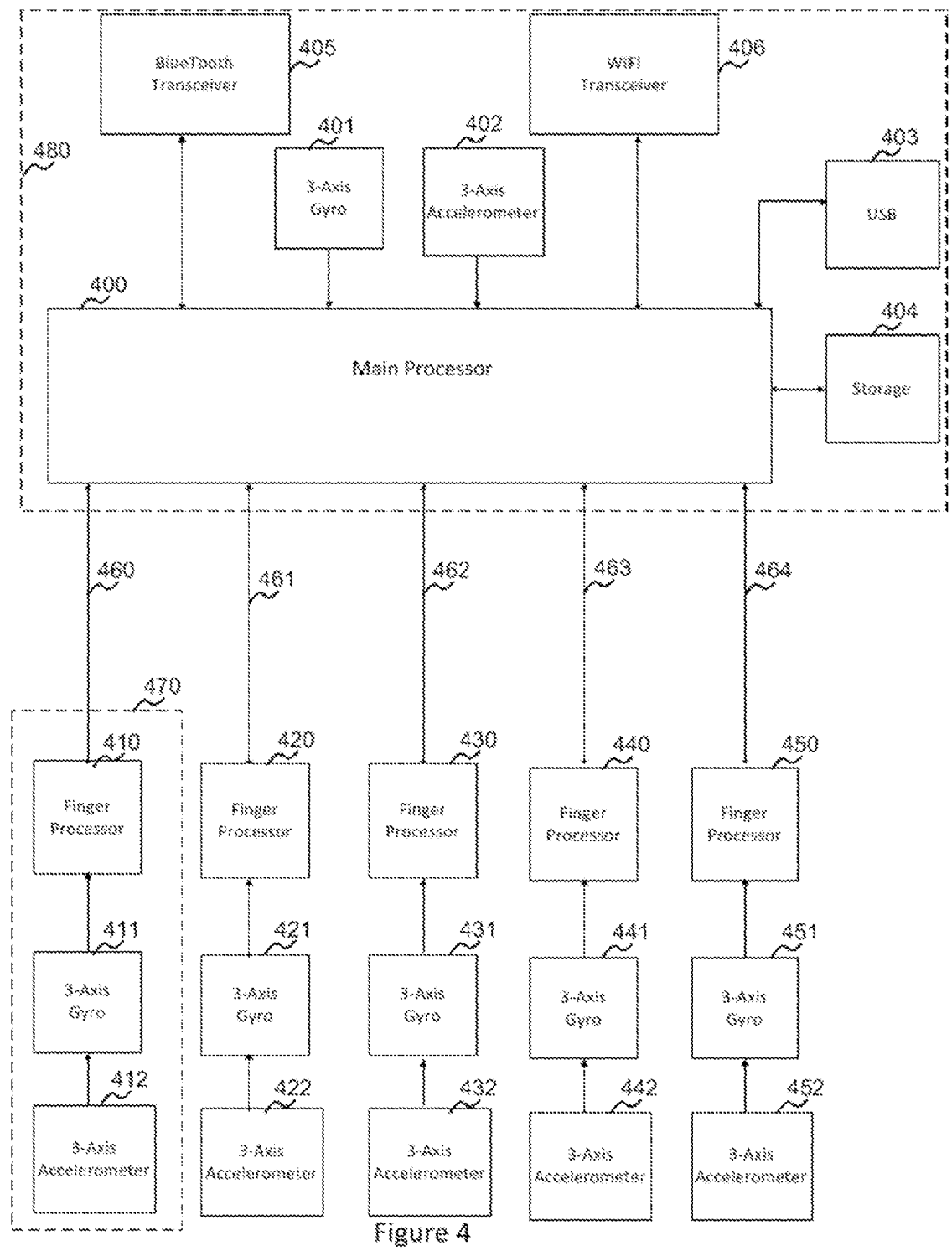
FIG. 4 depicts a block diagram of a preferred embodiment of the device, according to an illustrative embodiment.

The following hardware description of the invention refers to FIG. 4. The following hardware description does not limit the invention. Instead, the scope of the invention is defined by the appended claims and equivalents.

FIG. 4 depicts a block diagram of a preferred embodiment of one hand of an Imagine device with sensors and associated logic and circuitry. One skilled in the art would recognize that this is one example of one embodiment, and not the only way in which such a device could be built. This block diagram and associated discussion is presented for illustrative purposes and is not intended to limit the current invention.

In general, motion data from sensors such as 3-axis gyros 451 and 3-axis accelerometers 452 go to the main processor 400 and from there to a second electronic device through an output module such as 406.

Block 480 shows the main processing module incorporating processing, communications, storage and some sensors. Block 470 shows the circuitry that can be used for an individual finger. As can be seen, this block is replicated five times—one for each finger on a typical human hand.

The most notable feature of block 480 is the Main Processor. In one example, a PIC24FJ64GB004 microcontroller from Microchip Technologies, Inc. of Chandler, Ariz. is used. One skilled in the art would understand that chips are continually becoming more powerful and energy efficient every year. The chip mentioned above is illustrative of what is possible at the time of this writing. This is a microcontroller with very low power consumption to maximize the battery life of the device. Additionally, this microcontroller has a USB port built for direct connection to a USB interface connector 403. For the Imagine device, USB is used to connect the device to another electronic device for configuration purposes. WiFi connections, such as those provided by the WiFi transceiver 406 sometimes require passwords in order to work. It is through the USB port that a password may be set. One skilled in the art would understand that a more powerful processing chip could be chosen with the down side of lower battery life and more heat generation.

Similarly, BlueTooth connections, such as those provided by BlueTooth Transceiver 405 may require configuration data. This may be provided to the Imagine device through the USB connection 403. The configuration data may be stored in long term storage 404. Other configuration data, possibly relating to motion recognition, can also be stored in long term storage 404.

In the preferred embodiment, the physical implementation of block 480 would be worn on the wrist of a user. As such, it is in a unique location to acquire reference motion data related to arm position. One 3-axis gyroscope 401 and one 3-axis accelerometer 402 are included in the block to generate the motion data.

Motion data, along with any other pertinent data regarding the state of the Imagine device, may be transferred to a second electronic device that is configured to receive data from the Imagine device. Although the block diagram shows both BlueTooth and WiFi, one skilled in the art would recognize that this could be cost prohibitive for a mass market product and one interface may have to be chosen over the other. The Imagine device is not in any way restricted to a choice of these two communication methods. The relatively low data rate associated with the Imagine device allows for the use of many different types of wired and wireless communications methods, known in the art.

Block 470 shows the circuitry that is intended to be used on an individual finger. In the preferred embodiment, some form of flexible connection, most likely wires 460, connect block 480 to finger block 470. Many of the available sensors use an I2C bus for communication with their processor. In a traditional design, all of the sensors would share a single I2C bus. Most I2C devices have at least two addresses at which they will respond. While some memory devices may have as many as eight addresses, sensors tend to have only one or two.

This presents a problem in that a single I2C bus cannot support as many sensors as the device require. The reason for the lack of addressing options for the sensors is that the sensor manufacturers do not considered it reasonable or desirable to have multiples of the same sensor within close proximity to the main processor. If they were to be mounted to a typical PC board, the sensors would return essentially identical data, so there is no reason to do it.

In the case of the Imagine device, it is desirable, in the preferred embodiment, for six identical sensors to be connected over to the main processer. Since each finger has its own set of sensors, the data will not be redundant. In order to support so many of the same sensors, multiple I2C interfaces are used to connect the Main Processor 400 to each finger's module. Block 470 shows a Finger Processor 410. While it is possible to just hang a remote sensor off of an I2C bus connected to a processor, there are practical reasons to avoid doing so for the Imagine device. By necessity, there must be some kind of flexible connection (or wireless connection) between the main processing module and a finger module. This connection is far more exposed than a few traces on a PC board would be. Some of the current generation of sensors are extremely sensitive to static charges. One method of minimizing the charge that they could be exposed to is to place a more robust processor 410 between the main processor 400 and the remote sensors 410 and 411. Adding in a low cost processor for the Finger Processor 410, such as the Micro-Chip PIC12F1822, solves many of the problems discussed above.

The Finger Processor 410 can itself be configured to respond to a unique address on the I2C bus, while communicating to its attached sensors 411 and 412 on its own I2C bus. The isolation between the Main Processor bus 460 and the sensor's I2C bus allows for as many of the same sensors to be used in the system as desired without contention. Since each finger processor may have its own address on the bus, a single I2C bus could be used to control all of the Finger Modules if desired. In practice, there are some advantages to providing individual busses for each finger, such as full isolation of each data channel, and that is what is shown in the diagram.

An Imagine device therefore provides an extremely convenient and powerful user input device with many benefits. An Imagine device is able to capture more data points existing wearable input devices. It is self-contained, a user can use it in midair, without having to confine its use to an external reference surface, and the user can easily stash the Imagine device anywhere, such as a pocket, and take it anywhere, without having to worry about disconnecting or reconnecting any wired connections.

Figure 12:
FIG. 12 depicts a speech impaired women ordering coffee in American Sign Language while wearing an Imagine device and a small speaker, according to an illustrative embodiment.

Thus an Imagine device is able to capture a gesture based language, such as American Sign Language. FIG. 12 depicts a speech impaired individual ordering her morning coffee with American Sign Language, while wearing an Imagine device. The Imagine device is connected to a portable host with a speaker 1701. The American Sign Language gestures then are translated into spoken speech by the host. Among the Imagine's other benefits is the ability to play gesture based games.

Additional Embodiments

Start/Stop Gesture Switch for a Second User to Facilitate Gesture Training

In some of the illustrative embodiments discussed above, the Imagine device requires start/stop gesture input. Differently-abled individuals may have difficulties while defining gestures. In order to make user defining gestures less stressful the start/stop gesture input can be made by a second individual. In this case the first individual can concentrate on making gestures only. In this embodiment, an on/off switch either wired or wireless is available for a second individual to communicate start/stop gesture commands to the Imagine device.

Start/Stop Gesture Switch

Figure 14:
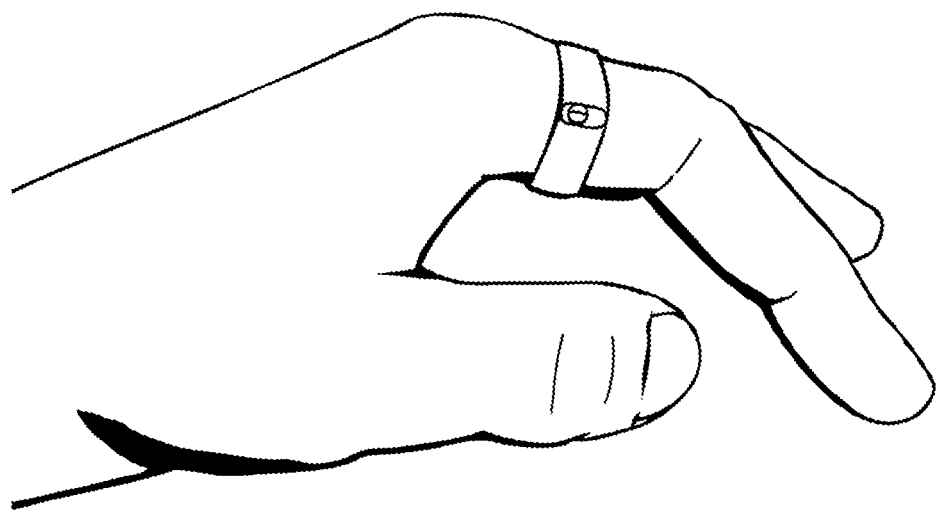
FIG. 14 depicts an Imagine device with a switch activated by the side of a thumb according to an illustrative embodiment.

In some of the illustrative embodiments discussed above, the Imagine device requires start/stop gesture input. This start/stop gesture input will be made repeatedly. Therefore, in order to make this input as easy and natural as possible, an additional embodiment of the Imagine device will further include an on/off switch for a user to indicate start/stop gesture input. A fully-abled individual's thumb is naturally held close to the base of the first finger, see FIG. 14. Thus a switch that is activated by a slight motion of a thumb towards the base of the first finger would be ideal for the purposes of this switch. One knowledgeable in the art would recognize that this switch could take many forms, physical, magnetic, optical, etc. that are known in the art. This switch can be on either the right or left thumb to accommodate user's preferences.

Sleep State

In some of the illustrative embodiments discussed above, some or all of the Imagine's components are wireless. Energy management is critical in wireless devices. An additional embodiment of the Imagine device will further include means to go into low power or "sleep" mode. In one embodiment the Imagine device will track start/stop gestures over time, and after a set period of time with no start/stop gestures will enter sleep mode. In another embodiment, the start/stop gesture switch discussed above will additionally be used as an on/off and or lower power mode switch.

When it is determined that the Imagine device should enter a sleep state, many of the subsystems may be shut down. Any and all of the communications channels, such as BlueTooth 405 and WiFi 406 may be shut off for the duration of the sleep period. Any storage devices such as 404 may also be turned off. The Main Processor 400 will enter a sleep mode and awaken briefly at preset intervals to turn on and poll its own sensors 401. 402 and possibly one or more remote Finger Sensors 470. Sensor data during the brief awake times would determine if there is any need to stay awake to verify a change of state, resume sleep, or fully wake up.

User Feedback

As discussed above, form factor and cost to manufacture are important considerations when designing a particular Imagine device. In some situations Imagine device user feedback may be requested by a host, or the Imagine Device may need to notify its user using its own user feedback mechanism.

Since the imagine device has full two way communication with the host computer, the Host may initiate a request to the Imagine device to use any of its feedback methods. The Imagine Device itself may initiate user feedback if it has something to communicate to its user. For instance, a low battery might result in a few short bursts of a rumble motor, repeated every minute.

Basic Imagine Device user feedback may include, but not limited to, visual means such as light emitting-diodes to indicate: on, sleep mode, low battery, start gesture on, and gesture not recognized. Additionally user input may enhance an Imagine's functionality in some situations. For example, a hearing impaired individual using an Imagine device to input American Sign Language to a host which translates it and renders it into spoken speech will require feedback that the system is working. This feedback can take many forms. In one embodiment an Imagine device may further include a device, such as speaker pointed at the back of a user's wrist, to provide tactile feedback to a user.

In another embodiment an Imagine device may have a video display, such as a LED video display, mounted on top of a wrist. The use of such a display is not known to the inventors at this time, but as the Imagine device is new in the art, the inventors anticipate it will be used in new and interesting ways.

One knowledgeable in the art would understand that there are many different means to provide user feedback such as visual, audio and, tactile known in the art and the above discuss is meant to illustrate and not limit methods of user feedback.

Gesture Based Sign Language Box

There are price and form considerations when designing an Imagine. Both of these change as technology inevitably improves. At the time of this writing building an Imagine with enough circuitry to perform gesture recognition over a large range of a gesture based sign language would be both too expensive and have too large a form factor to be attractive for the market. To solve this problem and enable a speech impaired individual to communicate freely using American Sign Language translated into spoken speech, see FIG. 12, in another embodiment an Imagine device would further include logic and circuitry for additional gesture recognition. This additional logic and circuitry will be housed in a user friendly manner, so that it could either fit in a shirt/jacket pocket or worn on a belt.

One objective of an Imagine device translating a gesture based language to spoken speech is to make the experience as natural as possible, both for the individual signing, and for the individual(s) listening to the spoken speech. Thus speaker placement is important, with a speaker close to an Imagine user's mouth preferable. In an additional embodiment, an Imagine would further comprise a speaker module 1701 either wired or wireless designed to be worn on a collar. In a further iteration, this module would include a housing to be worn on the front of a collar and a magnet designed to be worn on the back of a collar.

Additional Logic and Circuitry Box

The discussion above discussed an Imagine device further comprising additional logic and circuitry for American Sign Language to spoke speech translation. There may be other occasions where there is a need for additional logic and circuitry to communicate with a particular host. This additional logic and circuitry can be housed in a user friendly manner, so that it could either fit in a shirt/jacket pocket or worn on a belt. In another iteration this additional logic and circuitry may be housed in a manner than is attached directly to a host.

Additional Sensors at Specific Locations

Figure 13:
FIG. 13 depicts a user wearing an Imagine device with additional sensors at specific locations, according to an illustrative embodiment.

FIG. 13 depicts an individual ordering coffee while wearing additional sensors at specific locations. In an additional embodiment an Imagine may further include one or more additional sensors at specific locations, said locations to include a user's head, foot, ankle, and/or, elbow. A sensor may be embedded in an earring 1301. A sensor may be worn before the elbow joint 1302, of after an elbow joint. One objective of an Imagine device is to allow a user to make natural movements and/or gestures. Sensor 1301 can be used to detect shaking a head to indicate no, and nodding a head to indicate yes. Sensor 1302 can be used to detect moving the elbows away from the body. A sensor worn at the foot can detect a foot tapping motion. This motion can then be mapped to virtual buttons. For example, moving left foot to the left and tapping to virtual button one, left foot at a neutral position and tapping to virtual button two, left foot to the right and tapping to virtual button three, and so on.

To capture these head movement/gestures a 3-axis (6-degree-of-freedom) sensor may be attached to a user's head and through either wired or wireless means communicate with the Imagine logic and circuitry. In one embodiment this head sensor can be designed to attach to a user's headset. In another embodiment this head sensor can take the form of an earring, and as a further enhancement, this earring can be designed with different themes. The exact position of this sensor on the head is not important.

In a similar fashion an Imagine device may further comprise sensors at the front of the foot, heel, ankle and/or elbow.

Additional Sensors at Non-Specific Locations

One of the objects of an Imagine device is to allow user customization. This is particularly important for differently-abled individuals who may be limited in the motions they are able to make. Thus an Imagine device may further include sensors at non-specific locations. For example a sensor could be incorporated into clip-on nose jewelry and therefore be able to gather movement data on nose twitches. In a similar fashion a sensor could be designed to be attached to a shirt and positioned to gather data on shoulder shrugs. A sensor could be attached to one or both eyebrows, for users that can raise their eyebrows. A sensor could be attached somewhere on a jawbone, through piercing or bear clip on, to gather data from a mouth opening and closing. Sensors can be incorporated into body piercings. In general, sensors can be positioned in any location on a body that a user can make a controlled gesture.

Moving Vehicles

An Imagine device may be used on a moving vehicle, such as a plane, train or automobile. This presents the problem of eliminating the motion of the vehicle, for accurate gesture recognition. In an additional embodiment an Imagine device may further comprise a foot sensor for the purpose of gather data on the moving vehicle. The user would be instructed that for best results they keep their foot flat on the ground. This sensor could be integrated into a shoe insert. In a further embodiment it could be designed to clip onto a shoe. In another embodiment it takes the form of an ankle bracelet. The exact placement of this sensor is not important as long as a user can keep the sensor free from user movement.

Logic and Circuitry Enclosures

Figure 15:
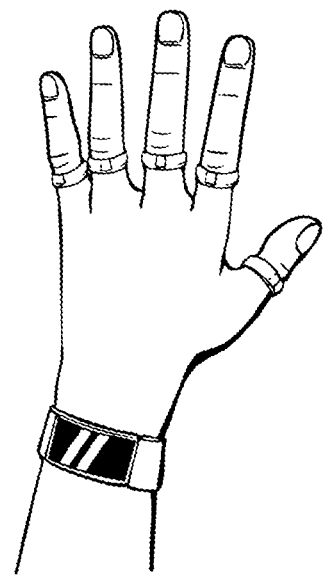
FIG. 15 depicts an Imagine device with a "predator" wrist mount with video display, according to an illustrative embodiment.

In another embodiment the Imagine Device's logic and circuitry is contained in a watch like enclosure. This may be a functional watch. FIG. 15 depicts another embodiment where the Imagine device's logic and circuitry is contained in a wrist-mounted enclosure which may additional contain a video screen and additional buttons.

Plug-In Features

Figure 16:
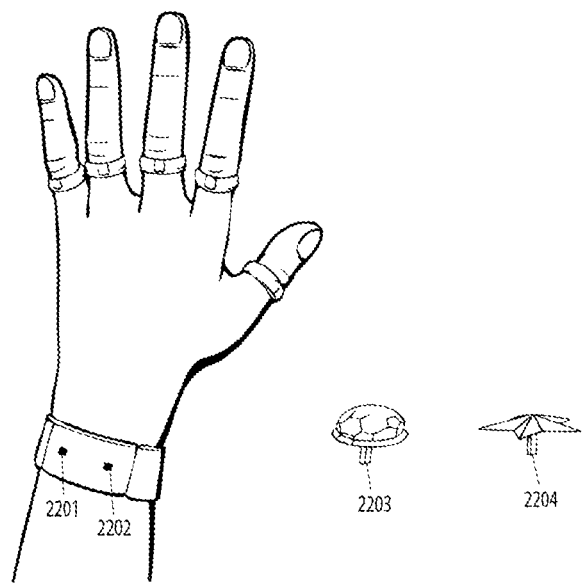
FIG. 16 depicts an Imagine device with a wrist mount with sockets to accept plug in devices according to an illustrative embodiment.

In another embodiment the Imagine device may have a plurality of sockets designed to accept decorative features. FIG. 16 depicts an Imagine device having two sockets 2201 and 2202 to plug-in features 2203 and 2204. These features may be purely decorative. These features may be active, such as having an RFID chip in them. These active features may be part of a collectible game, in which a user gains in-game benefits from having particular features. The RFID chip may unlock special features of a game.

LED Lights on Rings

In another embodiment, Imagine Devices that have a form of rings that house sensors may further comprise decorative LED lights.

Pre-Determined Gestures

The discussion above has focused on user defined gestures. Enabling users to define their own gestures is particular important for differently-abled individuals, however, this ability is presented to enhance, not limit, a user's experience. For training purposes it may be advantageous to have a user learn pre-defined gestures. For users who plan to use an Imagine device primarily in keyboard or mouse mode, it may be advantageous to have pre-determined gestures. It may be easier to move some users of traditional input means to an Imagine device if they are provided pre-determined gestures to begin with.

Voice Input

In another embodiment an Imagine device will further comprise a microphone to accept voice/sound input.

E-Field Sensor

In another embodiment an Imagine device will further comprise an e-field sensor[s]. E-field sensors are proximity sensors. Thus additional data can be generated, such as the distance between a user's hands, or the distance of a user's hand from a fixed object, such as a desktop.

Proximity Sensors

In another embodiment some sensors of an Imagine device attached to a user's thumb and fingers may be proximity sensors. For example, for cost savings purposes proximity sensors may be substituted for 6 degree of freedom sensors for the three middle fingers, with the thumb and pinkie having 6 degree of freedom sensors. An additional benefit of proximity sensors is their high reliability and long functional life.

Light Sensors

In another embodiment some sensors of an Imagine device attached to a user's thumb and fingers may be light sensors. For example, for cost savings purposes light sensors may be substituted for 6 degree of freedom sensors for the three middle fingers, with the thumb and pinkie having 6 degree of freedom sensors. This would work especially well if rings or other markers with specific patterns and or colors were worn on the three middle fingers. An emitter detector pair on the outer fingers would be able to measure the reflectivity and roughly determine the relative positions.

Magnetic Sensors

In another embodiment some sensors of an Imagine device attached to a user's thumb and fingers may be magnetic sensors, such as Hall Effect sensors. In particular, for Imagine devices that are used in keyboard modes, using magnetic sensors may enable a user to make more precise gestures with less effort than other methods. There may be a cost savings in substituting some 6 degree of freedom sensors with magnetic sensors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A wearable digital input device comprising:
   a. digit movement sensors configured to be worn on a plurality of digits, such that one sensor is affixed to one digit, each sensor is comprised of at least one accelerometer and/or gyroscopic sensor,
   b. two wrist movement sensors configured to be worn on a wrist, one sensor on a right wrist and one sensor on a left wrist, each sensor is comprised of at least one accelerometer and/or gyroscopic sensor,
   c. an input component configured to accept data from the movement sensors,
   d. a processing component configured to interpret data from the movement sensors, and
   e. an output component configured to output a signal from the processing component to an electronic device.

2. The wearable digital input device of claim one further comprising:
   two hand sensors configured to be worn on the back of a palm, one sensor on the back of a right palm and one sensor on the back of a left palm.

3. The wearable digital input device of claim one wherein there are 10 digit movement sensors.

4. The wearable input device of claim one further comprising;
   one or more movement sensors encased in a clip, designed to be positioned on a user's clothes, belt, footwear, eyewear and/or headphones.

5. The wearable input device of claim one wherein a plurality of movement sensors include an accelerometer.

6. The wearable input device of claim one wherein a plurality of movement sensors include a gyroscope.

7. The wearable digital input device of claim one further comprising:
   a switch useable by a second individual who is not wearing the digital input device for the purpose of indicating start/stop gesture input.

8. The wearable digital input device of claim one further comprising:
   a switch for the purpose of indicating start/stop gesture input.

9. The wearable digital input device of claim seven wherein the switch is operable by a thumb.

10. The wearable digital input device of claim one wherein the processing component further includes:
    logic and circuitry to identify when the device is not in use, and subsequently put the device is low power mode.

11. The wearable digital input device of claim one further comprising:
    a user feedback component.

12. The wearable digital input device of claim one further comprising:
    a gesture-based language translating component comprising:
    a. logic and circuitry to interpret gestures to words,
    b. audio files,
    c. logic and circuitry to play an audio file which matches a gesture,
    d. an audio speaker.

13. The wearable digital input device of claim one wherein the electronic device includes additional logic and circuitry configured to interpret the sensor data and output said sensor data in a predetermined format for a particular electronic device.

14. The wearable digital input device of claim one further comprising:
    a plurality of movement sensors at specific locations, said specific locations to include head, foot, heel, ankle and elbow.

15. The wearable digital input device of claim thirteen wherein the head movement sensor is enclosed in an earring.

16. The wearable digital input device of claim one further comprising:
    a plurality of movement sensors at non-specific locations, designed to be worn anywhere a user can make a controlled motion.

17. The wearable digital input device of claim fifteen wherein the movement sensors at non-specific locations are enclosed in body piercing jewelry.

18. The wearable digital input device of claim one further comprising:
    a motion cancelling component, to eliminate the motion of a moving vehicle.

19. The wearable digital input device of claim one further comprising:
    a microphone and associated logic and circuitry to allow voice input.

20. The wearable digital input device of claim one further comprising:
    an e-field sensor.

21. The wearable digital input device of claim one wherein some digit movement sensors are proximity sensors.

22. The wearable digital input device of claim one wherein some digit movement sensors are light sensors.

23. The wearable digital input device of claim one wherein some digit movement sensors are magnetic sensors.

24. The wearable digital input device of claim one wherein the processing component is further configured to include a time component to the data from the movement sensors.

25. A wearable digital input device comprising:
    a. digit movement sensors configured to be worn on a plurality of digits, on one hand, such that one sensor is affixed to one digit, each sensor is comprised of at least one accelerometer and/or gyroscopic sensor,
    b. a wrist movement sensor configured to be worn on a wrist, each sensor is comprised of at least one accelerometer and/or gyroscopic sensor,
    c. an input component configured to accept data from the movement sensors, d. a processing component configured to interpret data from the movement sensors, and
e. an output component configured to output a signal from the processing component to an electronic device.

\* \* \* \* \*